United States Patent [19]

Lederman

[11] Patent Number: 5,056,636

[45] Date of Patent: Oct. 15, 1991

[54] MODULAR LEG TYPE ROLLER CLUTCH WITH SNAP TOGETHER ASSEMBLY

[75] Inventor: Frederick E. Lederman, Sandusky, Ohio

[73] Assignee: General Motors Corporation, Detroit, Mich.

[21] Appl. No.: 651,876

[22] Filed: Feb. 7, 1991

[51] Int. Cl.⁵ .............................................. F16D 41/06
[52] U.S. Cl. .................................... 192/45; 188/82.84
[58] Field of Search .................. 192/45, 44, 41 R, 38; 188/82.84

[56] References Cited

U.S. PATENT DOCUMENTS

| | | | |
|---|---|---|---|
| 3,054,489 | 9/1962 | Fahlberg | 192/45 |
| 3,087,590 | 4/1963 | Gorsky | 192/45 |
| 3,406,799 | 10/1968 | Helmer | 192/45 |
| 3,750,782 | 8/1973 | Costantini et al. | 192/45 |
| 4,782,931 | 11/1988 | Lederman | 192/70.12 |
| 4,874,069 | 10/1990 | Lederman | 192/45 |
| 4,953,353 | 9/1990 | Lederman | 60/345 |

Primary Examiner—Richard Lorence
Attorney, Agent, or Firm—Patrick M. Griffin

[57] ABSTRACT

A leg type roller clutch has its components retained together as a modular assembly by a pair of cage members that snap fit into the cam race from either side of the clutch. Retention flanges on each cage member are inserted between the ends of the cam race legs and the pathway, and include flexible barbs that snap into grooves in the ends of the cam race legs. Special slots in the retention flanges allow the barbs to flex freely as they are inserted, allow the barbs to be easily molded, and provide a lubricant flow path, as well.

3 Claims, 6 Drawing Sheets

MODULAR LEG TYPE ROLLER CLUTCH WITH SNAP TOGETHER ASSEMBLY

This invention relates to overrunning roller clutches in general, and specifically to a leg type roller clutch that may be easily snapped together as a modular assembly.

BACKGROUND OF THE INVENTION

Roller clutch assemblies are often used in modern vehicle transmissions to serve as passively responding shift timers, thereby smoothing out gear changes. The roller clutch assembly is a functional part of a larger clutch package that includes a central shaft and a surrounding stack of friction disks that engage under hydraulic fluid pressure. The roller clutch assembly is interposed between the central shaft and disk pack, with the inner race splined to the shaft and the outer race splined inside the disk pack. As such, the roller clutch is subjected to a fairly harsh environment in terms of heat, radial and axial loads, friction and wear. In such an environment, a roller clutch is also often exposed to an available supply of pressurized lubricant, which is directed radially outwardly to the disk pack to prevent overheating of the interleaved plates.

The most frequently used type of roller clutch in the transmission clutch package application is the so-called journal block type, which includes a series of plastic bearing blocks that serve to keep the inner and outer clutch races radially spaced and coaxial. A cage generally retains the journal blocks, rollers and springs together as a subassembly that can be easily installed between the races. Typically, however, the cage is not used to retain the clutch races to the rest of the roller clutch as a modular unit or assembly. Instead, the cage and races are generally assembled at the same site where the entire clutch package is assembled. Consequently, the rollers and springs are inevitably exposed for a time, and extra care must be taken to avoid disturbing them. An older type of overrunning roller clutch, often referred to as a leg type roller clutch, does not use journal blocks. Instead, the cam race has an evenly spaced series of projections, so-called legs, machined integrally with it. The ends of the legs are ground to match the pathway, thereby creating bearing surfaces to directly support the pathway race as it overruns. The leg type clutch is generally capable of supporting greater loads, and the journal blocks are eliminated as a separate component. Leg type clutches are also subject to the same drawback of piecemeal race installation and the attendant roller and spring exposure, however.

SUMMARY OF THE INVENTION

The invention provides a leg type roller clutch assembly especially adapted for installation in the transmission clutch package environment described above. All components are easily assembled into a modular unit that avoids roller and spring exposure at installation. In addition, in the embodiment disclosed, provision is made for utilizing the available pressurized lubricant supply to serve the roller clutch.

The preferred embodiment disclosed includes an inner cam race adapted to be splined to the central shaft and an outer pathway race adapted to be splined inside the disk pack. While the pathway race is conventional, the cam race is especially adapted for the modular assembly technique used. The legs of the cam race, instead of being ground so as to directly support the pathway, are radially spaced therefrom, and each includes a circumferentially extending central groove cut into the end. A conventional roller and energizing spring is located between each pair of cam race legs. The rollers and springs are retained between the races by an identical pair of molded plastic cage members. Each cage member has a generally annular side plate that can be abutted with each of the races, as well as a series of finger like retention flanges that extend axially inwardly therefrom. The retention flanges are sized so as to fit into the radial spaces between the pathway and the ends of each cam race leg. Each retention flange is long enough to just reach one side of the groove in the cam race leg, and each has a flexible barb at the front. The retention flanges are inserted into the radial spaces between the pathway and the ends of the cam race legs until the flexible barbs snap into the grooves. Thereafter, the races, springs and rollers are retained together in a secure, rattle free modular assembly. The unit so provided may be installed in one step with no exposure of the rollers and springs.

In addition, in the particular embodiment disclosed, the cage members are specially designed for ease of manufacture and assembly, and also cooperate in the lubrication process. The resilient barb on each retention flange is backed by an axially extending molding access slot, which allows the side plate to be molded by a simple, axial draw technique. During assembly of the modular unit, the slot also allows each barb to flex freely up into the slot and up into the retention flange, even though the retention flange closely fills the space into which it is inserted. After the barb has snapped into place, the slot provides an open passage through which pressurized lubricant can reach both the pathway interface and the rollers and springs. In addition, each cage member is adapted to accept a special side mounted manifold that helps direct the flow of lubricant into the slot passages.

It is, therefore, a general object of the invention to provide a roller clutch assembly in which all components may be easily assembled and retained together in a modular unit that can be installed as one piece, thereby avoiding potential disturbance of the rollers and springs during installation.

It is another object of the invention to provide such a modular assembly in which race abutting cage members snap fit into grooves in the ends of legs of the cam race so as to retain all components together as a unit.

It is still another object of the invention to provide such a modular assembly that is particularly simple to manufacture and assemble. It is yet another object of the invention to provide such a modular assembly in which the same structural features that contribute to ease of manufacture and assembly also cooperate to provide lubrication to the roller clutch during operation.

DESCRIPTION OF THE PREFERRED EMBODIMENT

These and other objects and features of the invention will appear from the following written description, and from the drawings, in which.

Figure 1:
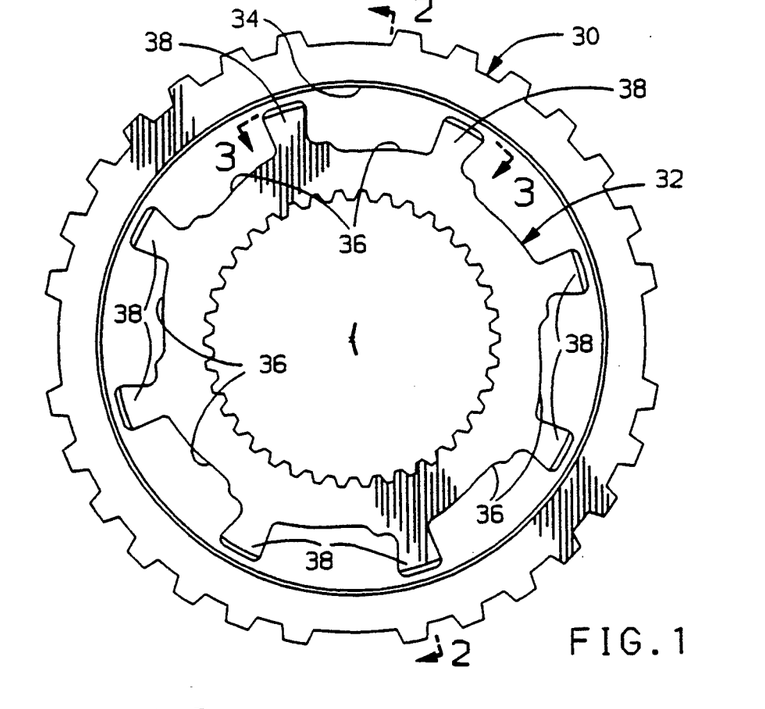
FIG. 1 is an end view of a pair of clutch races in coaxial relation.
Figure 2:
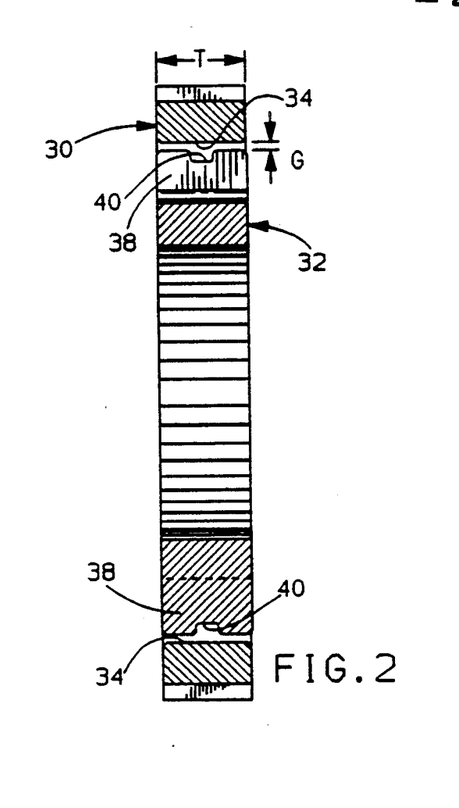
FIGS. 2 is a cross section of the races taken along line 2—2 of FIGS. 1.
Figure 3:
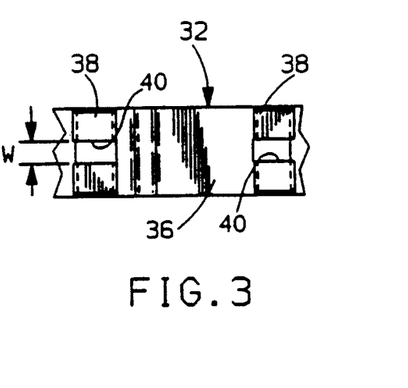
FIG. 3 is a view of the ends of a pair of adjacent cam race legs taken along the line 3—3 of FIG. 1.

Referring first to FIGS. 1 through 3, a pair of steel clutch races, including an outer pathway race, indicated generally at 30, and an inner cam race, indicated generally at 32, each has an identical axial thickness T measured between the axial end faces. While races 30 and 32 would not actually be coaxial until assembled and installed, they are so illustrated for ease of description. Pathway race 30 is conventionally configured, with a cylindrical pathway 34 on the inner diameter and splines on the outer, so as to slide axially into a conventional friction disk pack within an automatic transmission housing, not illustrated. Cam race 32 is also conventional in basic shape, with an evenly spaced series of eight sloped cam ramps 36, separated by radially extending legs 38. Being integral with the steel cam race 32, legs 38 are capable of supporting heavy loads. Unlike a conventional leg type clutch, however, the ends of legs 38 are not disposed at nearly the same diameter as pathway 34, nor are they ground to conform to it and directly support it. Instead, when the races 30 and 32 are maintained in the coaxial relation shown, the ends of the cam race legs 38 form a small radial space or gap G with pathway 34. In addition, the end of each cam race leg 38 has a circumferentially extending, full length shallow groove 40 cut into the axial center thereof, with a width W about one quarter of T.

Figure 4:
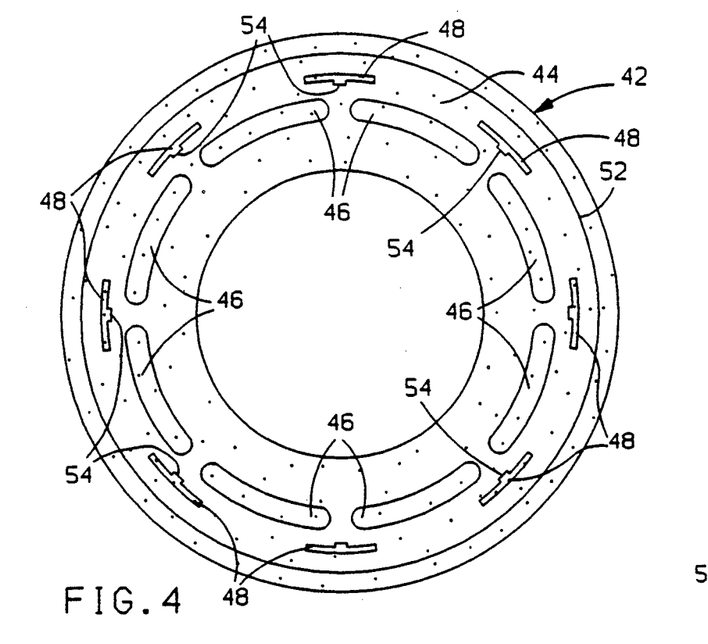
FIG. 4 is an end view of the inner side of a cage member alone.
Figure 5:
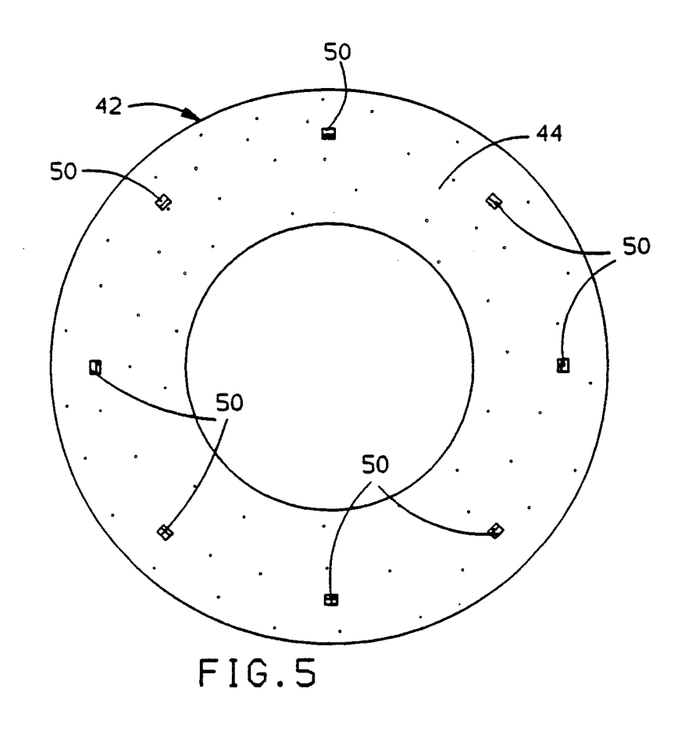
FIG. 5 is an end view of the outer side of a cage member alone.
Figure 6:
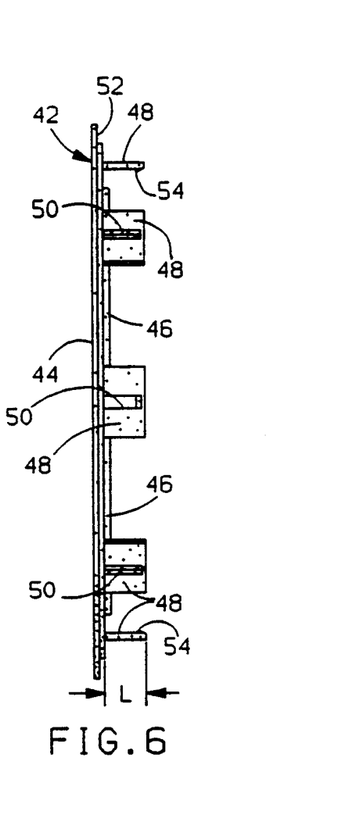
FIG. 6 is a side view of a cage member alone.

Referring next to FIGS. 4 through 6, the other main components are a pair of identical, one piece plastic cage members, one of which is indicated generally at 42. The major structural constituent of cage member 42 is an annular side plate 44, which is radially wide enough so as to be abuttable with the end faces of both races 30 and 32 at once, but narrow enough not to radially overlap either. Molded to the inside surface of side plate 44 are a series of eight slightly arcuate shallow projections 46, each of which is approximately as long as the circumferential separation of the cam race legs 38. Alternating with the projections 46 are a series of eight axially inwardly extending retention flanges 48. Each retention flange is molded at a diameter that serves to locate it directly at the radial gap G, when the side plate 44 and races 30 and 32 are aligned. In addition, each flange 48 has a thickness that closely matches G, a curvature that matches pathway 34, and a length L that is slightly less than one half of T. Each retention flange 48 is deliberately made wider in the circumferential direction than the end of a cam race leg 38. Each flange 48 also has a narrow, centrally located slot 50 that runs axially through side plate 44 for nearly the full length of flange 48. The perimeter of the inner surface of each side plate 44 also includes an annular notch 52, which serves a purpose described below.

Figure 7:
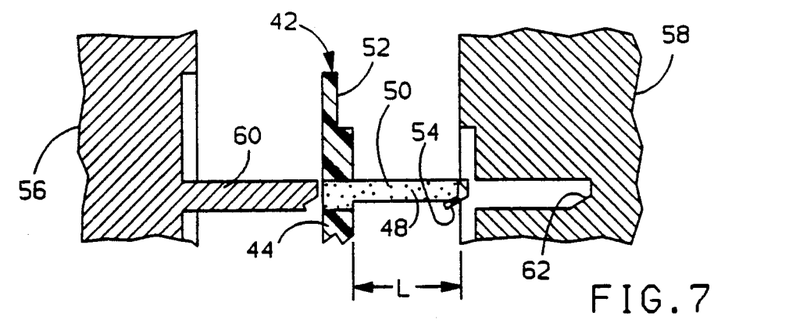
FIG. 7 is a sectional view of one retention flange of a cage member and that portion of a pair of molds that form it.

Referring next to FIG. 7, additional structure of cage member 42, as well as its special molding technique, is illustrated. Each cage member 42 is injection molded of a material, such as glass filled nylon, which is tough, durable and heat resistant. Still, if molded in a suitably thin and short configuration, the material can be resilient and flexible, at least on a one time basis. Such a structure is a barb 54 located at front of each retention flange 48, at the end of each slot 50. Each barb 54 extends slightly axially and radially inwardly, but is shorter than the depth of a groove 40. Most of the outer surface of cage member 42 is configured so as to have no radial overlap with itself, and is therefore inherently simple to mold. However, the barb 54 does have a radial overlap with at least a small portion of the side plate 44. As such, if cage member 42 were to be molded as a solid piece, some kind of sliding element would have to be provided to create the barb 54. One of the main purposes of slot 50 is to allow barb 54 to be injection molded by a so-called axial draw, or axial by pass, technique, with no sliding mold elements or part removal stress. A single pair of left and right mold halves, indicated generally at 56 and 58 respectively, part along a straight axis. Left mold half 56 includes eight evenly spaced fingers 60, one of which is shown, and each of which is the same length and width as slot 50. Right mold half 58 includes eight evenly spaced pockets 62, one of which is shown, and each of which is the same size as a retention flange 48. When the mold halves 56 and 58 close, each finger 60 enters the center of a pocket 62 and liquid plastic material is injected. A retention flange 48 is formed inside pocket 62 and around finger 60, and a barb 54 is formed in the space between the end of finger 60 and the bottom of pocket 62. When the mold halves 56 and 58 are parted, each finger 60 withdraws freely from a respective slot 50, and each barb 54 withdraws freely from a respective pocket 62. Barb 54 is exactly as wide as the slot 50 that is left behind it. However, the invention here does not reside just in devising a design for cage member 42 that is simple to mold. It resides in devising a design in which the structural features that lend themselves to ease of molding also cooperate to provide assembly and operation advantages, as described next.

Figures 8, 9:
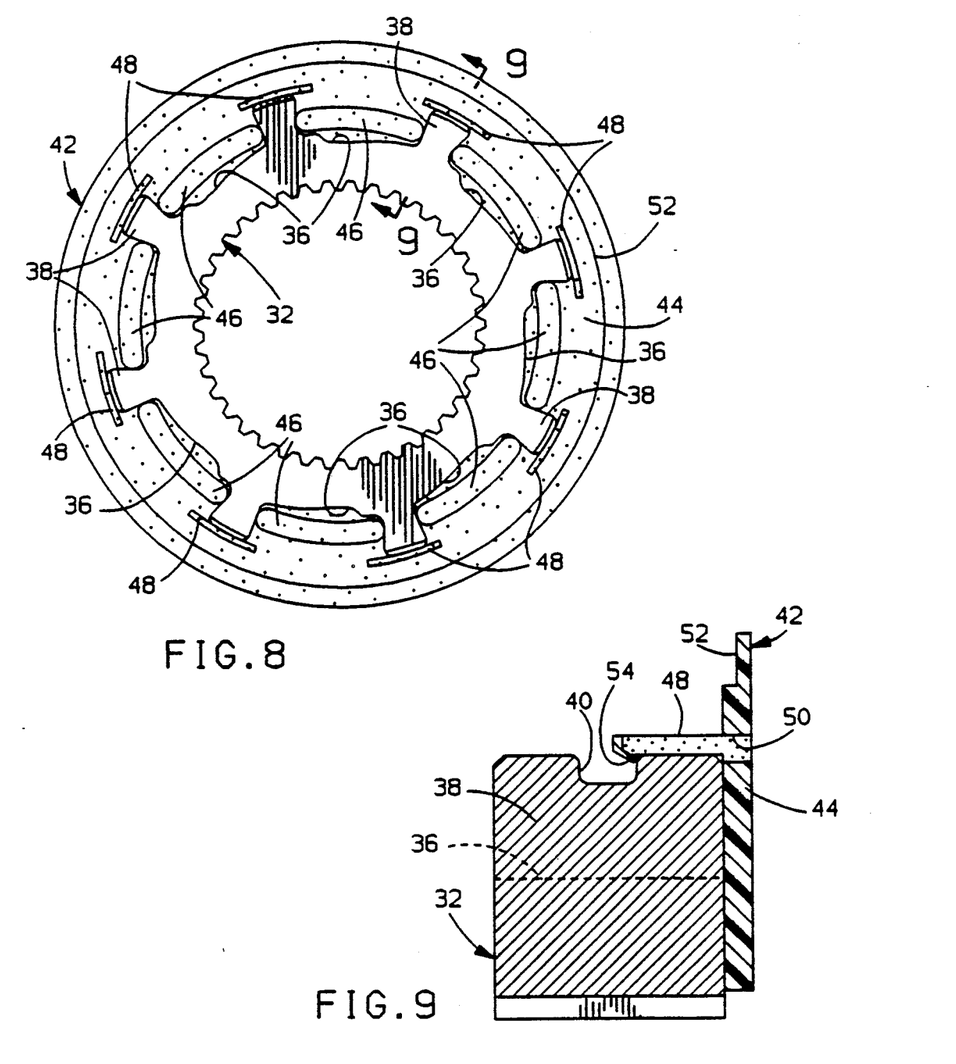
FIG. 8 is an end view of the cam race and one cage member installed to it as an interim subassembly.
FIG. 9 is a sectional view taken along the line 9—9 of FIG. 8.
Figures 10, 11:
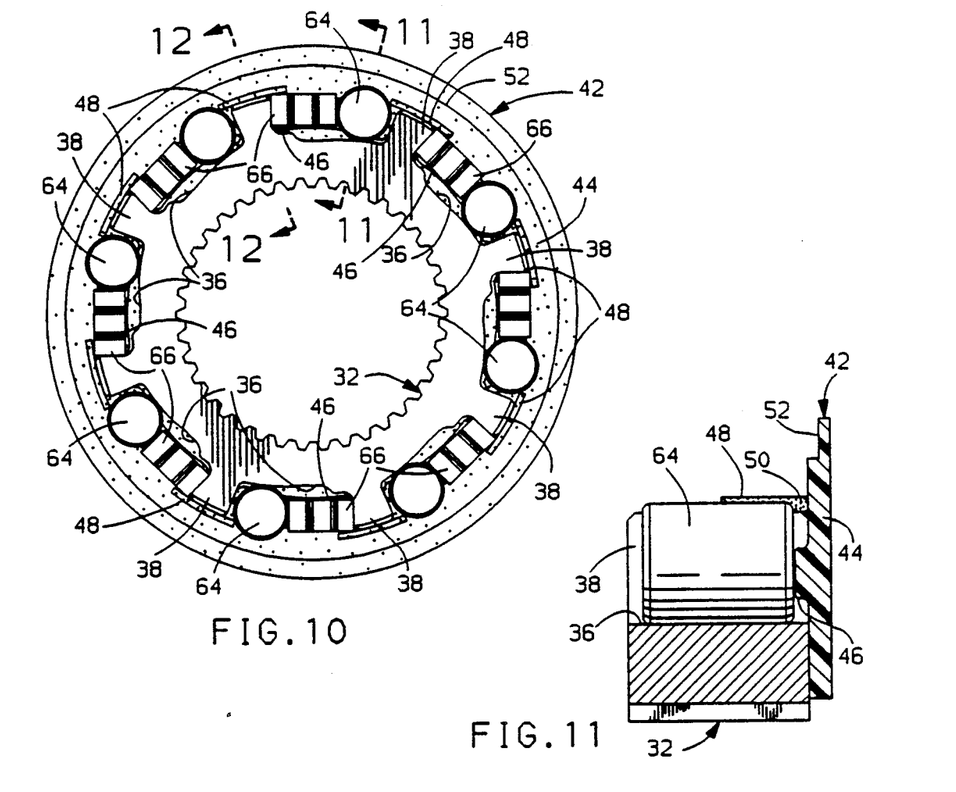
FIG. 10—10 is an end view of the subassembly of FIG. 8 with rollers and springs added.
FIG. 11—11 is a sectional view taken along the line 11—11 of FIGS. 10, showing a roller in elevation.
Figure 12:
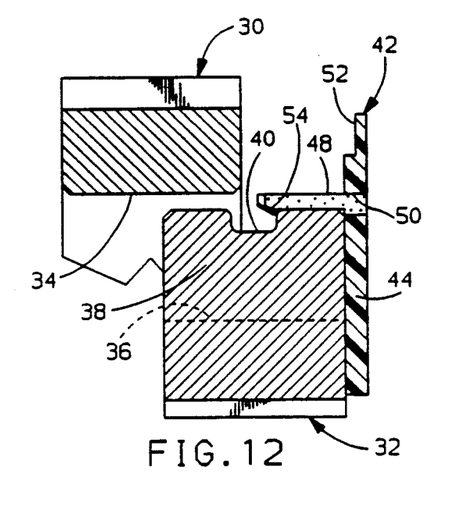
FIG. 12 is a view taken along line 12—12 of FIG. 10, showing the pathway race in the process of being installed.
Figure 13:
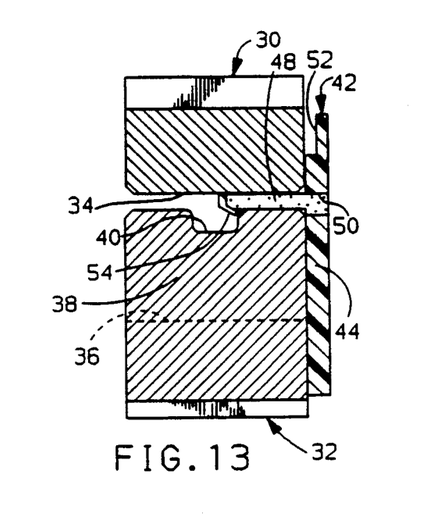
FIG. 13 is a view like FIG. 12, showing the pathway race installed.

Referring next to FIGS. 8 through 13, the first steps in the assembly process of the components described above are illustrated in detail. First, as shown in FIGS. 8 and 9, one cage member 42 is aligned with cam race 32 and the two are pushed axially together. The barbs 54 slide over the ends of the cam race legs 38, flexing in a manner described below, until they reach the grooves 40. Then, given the relation of the length L to the thickness T described above, each barb 54 snaps into a respective groove 40, and cage member 42 is snugly retained to the side of cam race 32, with the retention flanges 48 overlaying and overhanging the ends of the cam race legs 38. The projections 46 fit closely between the adjacent cam race legs 38 to prevent relative circumferential twisting. Next, a conventional roller 64 and spring 66 are added between each pair of adjacent cam race legs 38, nested within and supported temporarily by the overhang of the retention flanges 48, as shown in FIGS. 10 and 11. In the temporary subassembly so created, the rollers 64 are retained in a uniform and secure position, so that the outer race 30 may be added by the so-called ringing in technique, in which it is pushed axially over the rollers 64 and twisted simultaneously counterclockwise a few degrees. The rollers 64 are shifted down the cam ramps 36 and the pathway 34 moves axially over the retention flanges 48, as shown in FIGS. 12 and 13.

Figure 14:
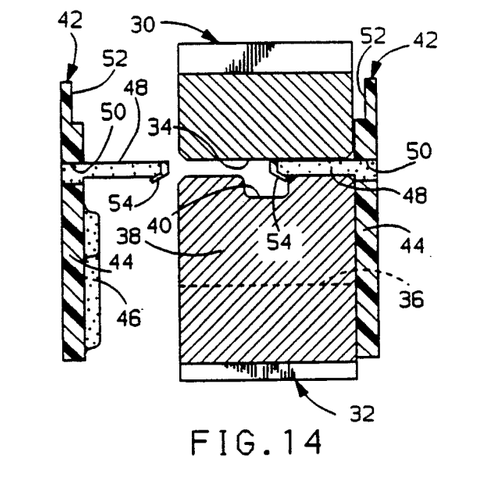
FIG. 14 is a view like FIG. 13, showing the other cage member aligned and ready to be installed.
Figure 15:
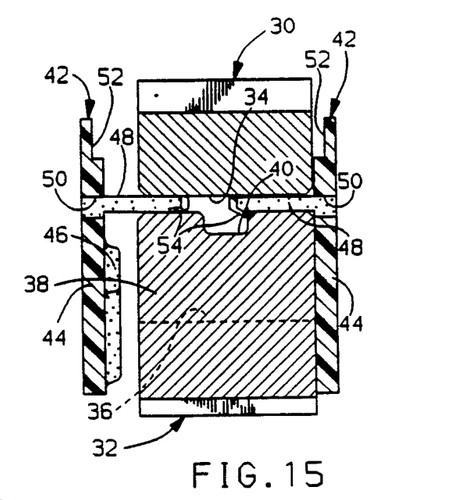
FIG. 15 is a view like FIG. 14, showing the other cage member in the process of being installed.

Referring next to FIGS. 14 and 15, the final assembly steps are illustrated. The second cage member 42 is added by inserting its retention flanges 48 into the radial gaps G between the pathway 34 and cam race legs 38 until the flexible barbs 54 eventually snap into the grooves 40. In effect, the first cage member 42 is assembled in the same fashion as the second, because its retention flanges 48 are inserted into the same gaps G, even though the pathway race 30 is not yet in place. It would be possible, however, to temporarily hold the races 30 and 32 in a coaxial orientation in a jig or support, add the rollers 64 and springs 66, and then snap each cage member 42 into place, one after the other or simultaneously. FIG. 15 best illustrates another important advantage of the slot 50. Since it is as wide as barb 54, and much longer, it creates enough space that the barb 54 it extends behind can freely flex, without damage, up into the same space occupied by the retention flange 48. The retention flange 48 can therefor be made essentially as thick as the gap G that it is inserted into, but still not interfere with the flexing of the barbs 54. Only the alignment and insertion steps illustrated are needed for the cage members 42. No separate riveting, welding or other operation are needed.

Figure 16:
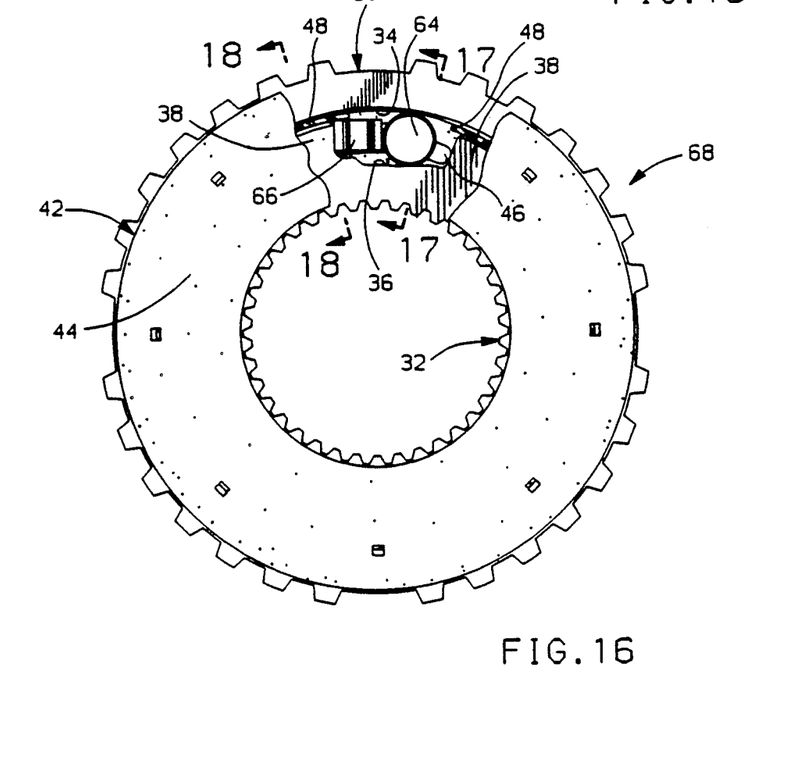
FIG. 16 is an end view of the completed modular assembly of the invention, with part of the cage member broken away.
Figure 17:
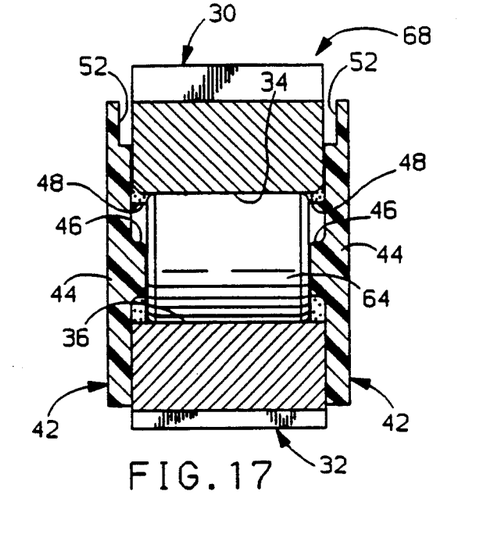
FIG. 17 is a sectional view taken along the line 17—17 of FIG. 16.
Figure 18:
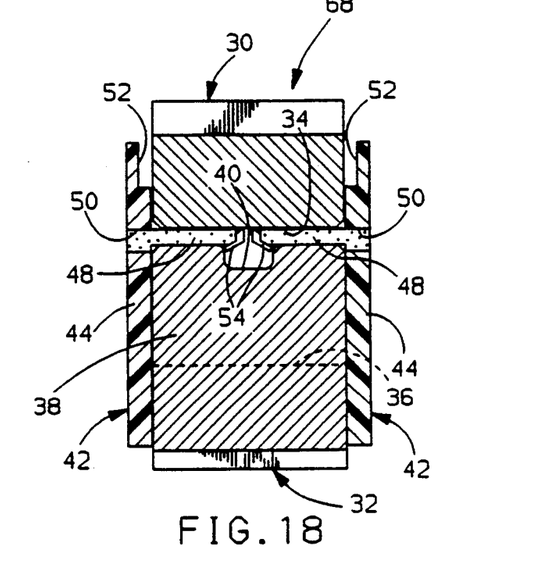
FIG. 18 is a sectional view taken along the line 18—18 of FIG. 16.

Referring next to FIGS. 16 through 18, the complete modular assembly is illustrated generally at 68. With the other cage member 42 snapped into place, the end faces of both races 30 and 32 are abutted with the bordering side plates 44, and securely retained together. The rollers 64 and springs 66 are captured between the opposed pairs of projections 46. Assembly 68 is thus built up completely at the manufacturing site, which can ship the product to the installation site easily. The modular unit 68 can then be easily installed by the ultimate assembler of the transmission without exposing the rollers 64 and springs 66. After installation, the retention flanges 48, by closely filling the gaps G and conforming to the pathway 34, provide bearing surfaces to keep the races 30 and 32 accurately spaced apart and coaxial. The slots 50 are narrow enough that they do not interfere with the bearing function. The bordering side plates 44 serve to armor and protect the rest of the components of assembly 68 from thrust loading from any adjacent structure. The overhang of the retention flanges 48 serves to shield the pathway 34 from contact with the springs 66. However, no significant circumferential space between the cam race legs 38 that could otherwise be occupied by the rollers 64 and springs 66 is taken up by the retention flanges 48.

Figure 19:
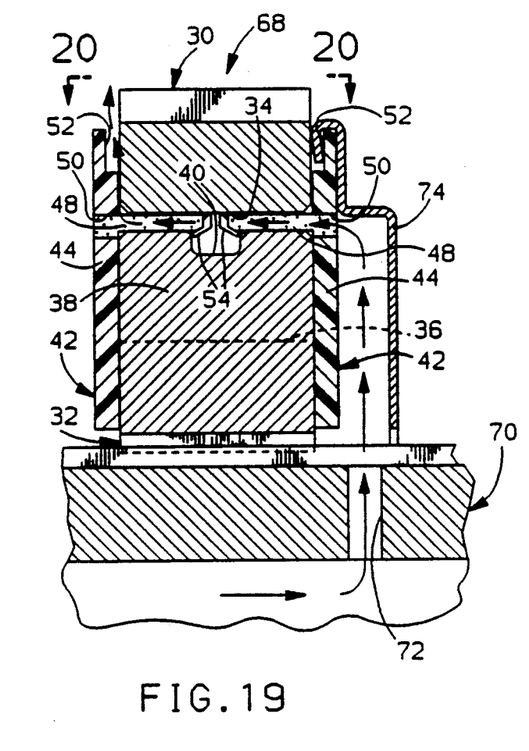
FIG. 19 is a view like FIG. 18, but showing the modular assembly with the addition of an oil distributing manifold and installed on a transmission shaft.
Figure 20:
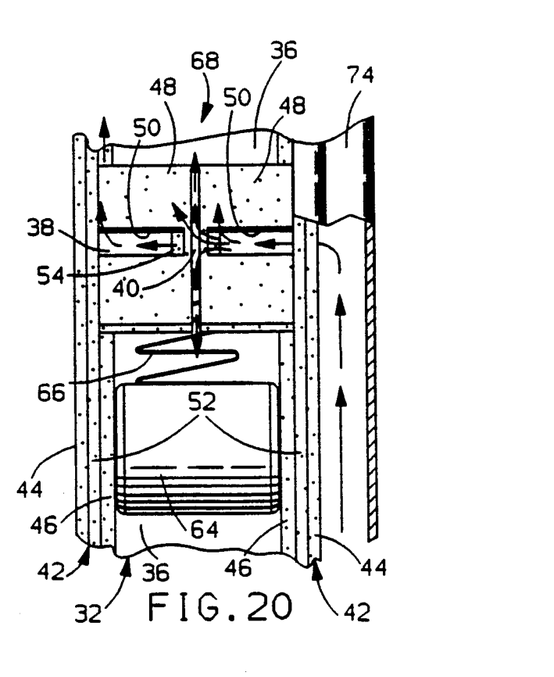
FIG. 20 is a view looking along the line 20—20 of FIG. 19 with the outer race removed.

Referring next to FIGS. 19 and 20, additional operational advantages are illustrated. In the particular embodiment disclosed, shaft 70 outlets 72 that supply lubricant under pressure, which can flow radially outwardly, as shown by the arrows, ultimately reaching the disk pack to lubricate it. A metal manifold 74, stamped from sheet stock in the shape of a hollow annulus, is crimped tightly into the perimeter notch 52 of the right hand cage member 42, overlaying the shaft outlet 72. Manifold 74 thereby acts as a scoop to catch the majority of the outflow from outlet 72, which moves radially outwardly until it reaches the eight slots 50. The slots 50 thereafter provide a ready passage axially inwardly by which lubricant can reach the interface between pathway 34 and the flanges 48 as well as the central grooves 40. Lubricant can therefor reach all areas that might require lubrication, including the roller 64-pathway 34 interface. The fact that the grooves 40 run the full length of the ends of the cam race legs 38, and the fact that the opposed retention flanges 48 do not touch at the ends, helps in the flow distribution process. Therefore, it may be seen that the cooperation of the grooves 40 and retention flanges 48 leads to advantages in essentially every area, including manufacture, assembly, shipping, installation and handling, and operation.

Variations of the disclosed embodiment could be made. Fewer than all of the retention flanges 48 could be provided with barbs 54, and fewer than all of the cam race legs 38 could be provided with grooves 40, if all that were desired were to provide a snap together, modular assembly. The ends of the remaining cam race legs 38 could be configured and ground conventionally, so as to directly support the pathway 34. Advantages lost would be the complete pathway support and shielding provided by having all eight flanges 48. In addition, if most of the pathway support were provided directly by the ends of the cam race legs 38, then the few retention flanges 48 needed just to provide snap fit retention could conceivably be thinner, and therefore not require the slots 50 to provide flex room for the barbs 54. In an application where lubrication was not so necessary, the manifold 74 and the perimeter notches 52 could be eliminated. Or, more than one manifold 74 could be added in an application where two outlets 72 were available, since each side plate 44 has a notch 52 available. In such a case, with a high flow of lubricant being pumped from both sides toward the central grooves 40, it would also be possible to add feed holes radially through the outer race 30 so that lubricant could reach the disk pack. Therefore, it will be understood that it is not intended to limit the invention to just the embodiment disclosed.

The embodiments of the invention in which an exclusive property or privilege is claimed are defined as follows:

1. An overrunning roller clutch assembly, comprising,
   a pathway race having a cylindrical pathway,
   a cam race coaxially disposable relative to said pathway race, said cam race having a plurality of evenly circumferentially spaced legs extending toward said pathway at least one of which has an end with a generally centrally located groove therein and is radially spaced from said pathway, a roller and energizing spring pair located between each pair of adjacent cam race legs, a first cage member having a side plate abuttable with each of said races and a retention flange extending axially inwardly therefrom and sized so as to fit into the radial space between said pathway and cam race legs, said retention flange also having a flexible barb adapted to snap into said groove, and, a second cage member having a side plate abuttable with each of said races and a retention flange extending axially inwardly therefrom and sized so as to fit into the radial space between said pathway and cam race legs, said retention flange also having a flexible barb adapted to snap into said groove, whereby said races, rollers and springs may be retained together as a modular assembly by inserting said retention flange into the radial space between said pathway and cam race leg until said flexible barb enters said groove, thereby maintaining said side plates in abutment with said races and capturing said rollers and springs.

2. An overrunning roller clutch assembly, comprising, a pathway race having a cylindrical pathway, a cam race coaxially disposable relative to said pathway race, said cam race having a plurality of evenly circumferentially spaced legs extending toward said pathway, each having an end with a generally centrally located groove therein and being radially spaced from said pathway by a predetermined amount, a roller and energizing spring pair located between each pair of adjacent cam race legs, a first cage member having a side plate abuttable with each of said races and a plurality of retention flanges extending axially inwardly therefrom and sized so as to conform to said pathway and to fit closely into said predetermined radial spaces between said pathway and cam race legs, said retention flanges also each having a flexible barb adapted to snap into said groove and a slot behind said flexible barb of sufficient length to allow said barb to flex freely into said retention flange, and, a second cage member having a side plate abuttable with each of said races and a plurality of retention flanges extending axially inwardly therefrom and sized so as to conform to said pathway and to fit closely into the predetermined radial spaces between said pathway and cam race legs, said retention flanges each also having a flexible barb adapted to snap into said groove and a slot behind said flexible barb of sufficient length to allow said barb to flex freely into said retention flange, whereby said races, rollers and springs may be retained together as a modular assembly by inserting said retention flanges closely into said radial spaces between said pathway and cam race leg as said barbs flex into said slots until said flexible barbs enter said grooves, thereby maintaining said side plates in abutment with said races and capturing said rollers and springs and maintaining said races substantially coaxial.

3. An overrunning roller clutch assembly of the type that is adapted for use in an environment where it is exposed to a supply of pressurized lubricant, said assembly comprising, a pathway race having a cylindrical pathway, a cam race coaxially disposable relative to said pathway race, said cam race having a plurality of evenly circumferentially spaced legs extending toward said pathway, each having an end with a generally centrally located groove therein and being radially spaced from said pathway by a predetermined amount, a roller and energizing spring pair located between each pair of adjacent cam race legs, a first cage member having a side plate abuttable with each of said races and a plurality of retention flanges extending axially inwardly therefrom and sized so as to conform to said pathway and to fit closely into the predetermined radial spaces between said pathway and cam race legs, said retention flanges each also having a flexible barb adapted to snap into said groove and a slot behind said flexible barb running through said side plate, and, a second cage member having a side plate abuttable with each of said races and a plurality of retention flanges extending axially inwardly therefrom and sized so as to conform to said pathway and to fit closely into the predetermined radial spaces between said pathway and cam race legs, said retention flanges each also having a flexible barb adapted to snap into said groove and a slot behind said flexible barb running through said side plate, whereby said races, rollers and springs may be retained together as a modular assembly by inserting said retention flanges closely into the radial spaces between said pathway and cam race leg as said barbs flex into said slots until said flexible barbs enter said grooves, thereby maintaining said side plates in abutment with said races and capturing said rollers and springs with maintaining said races substantially coaxia, said slots also providing a path for said pressurized lubricant to flow axially between said cam race leg ends and pathway and into said grooves.

* * * * *